(12) United States Patent
Robichaud et al.

(10) Patent No.: US 11,386,268 B2
(45) Date of Patent: Jul. 12, 2022

(54) DISCRIMINATING AMBIGUOUS EXPRESSIONS TO ENHANCE USER EXPERIENCE

(71) Applicant: Microsoft Technology Licensing, LLC, Redmond, WA (US)

(72) Inventors: Jean-Philippe Robichaud, Mercier (CA); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 15/830,767

(22) Filed: Dec. 4, 2017

(65) Prior Publication Data

US 2018/0089167 A1 Mar. 29, 2018

Related U.S. Application Data

(63) Continuation of application No. 14/586,395, filed on Dec. 30, 2014, now Pat. No. 9,836,452.

(51) Int. Cl.
*G06F 40/30* (2020.01)
*G10L 15/22* (2006.01)
(Continued)

(52) U.S. Cl.
CPC ........ *G06F 40/295* (2020.01); *G06F 16/3325* (2019.01); *G06F 16/3329* (2019.01);
(Continued)

(58) Field of Classification Search
CPC ........ G06F 40/20; G06F 40/205; G06F 40/30; G06F 40/35; G10L 15/22; G10L 15/01;
(Continued)

(56) References Cited

U.S. PATENT DOCUMENTS 5,519,608 A * 5/1996 Kupiec ............... G06F 16/3329
704/9
6,266,668 B1 7/2001 Vanderveldt et al.
(Continued)

FOREIGN PATENT DOCUMENTS

CN 101297355 A 10/2008
CN 102750311 A 10/2012
(Continued)

OTHER PUBLICATIONS

"Second Written Opinion Issued in PCT Application No. PCT/US2015/067238", dated Nov. 23, 2016, 11 Pages.
(Continued)

*Primary Examiner* — Richard Z Zhu

(57) ABSTRACT

Methods and systems are provided for discriminating ambiguous expressions to enhance user experience. For example, a natural language expression may be received by a speech recognition component. The natural language expression may include at least one of words, terms, and phrases of text. A dialog hypothesis set from the natural language expression may be created by using contextual information. In some cases, the dialog hypothesis set has at least two dialog hypotheses. A plurality of dialog responses may be generated for the dialog hypothesis set. The dialog hypothesis set may be ranked based on an analysis of the plurality of the dialog responses. An action may be performed based on ranking the dialog hypothesis set.

18 Claims, 11 Drawing Sheets

(51) Int. Cl.

| | |
|---|---|
| *G06F 40/295* | (2020.01) |
| *G06F 16/332* | (2019.01) |
| *G06F 16/33* | (2019.01) |
| *G06F 40/35* | (2020.01) |
| *G10L 15/18* | (2013.01) |
| *G10L 15/183* | (2013.01) |

(52) U.S. Cl.
CPC ...... *G06F 16/3334* (2019.01); *G06F 16/3335* (2019.01); *G06F 16/3344* (2019.01); *G06F 16/3349* (2019.01); *G06F 40/30* (2020.01); *G06F 40/35* (2020.01); *G10L 15/1815* (2013.01); *G06F 16/3331* (2019.01); *G10L 15/183* (2013.01); *G10L 15/1822* (2013.01); *G10L 15/22* (2013.01); *G10L 2015/223* (2013.01)

(58) Field of Classification Search
CPC . G10L 15/815; G10L 15/1822; G10L 15/183; G10L 2015/223
See application file for complete search history.

(56) References Cited

U.S. PATENT DOCUMENTS

| | | | |
|---|---|---|---|
| 6,272,488 | B1 | 8/2001 | Chang et al. |
| 6,745,177 | B2 | 6/2004 | Kepler et al. |
| 7,340,454 | B2 | 3/2008 | Wu et al. |
| 7,398,209 | B2 | 7/2008 | Kennewick et al. |
| 8,131,705 | B2 | 3/2012 | Chevalier et al. |
| 8,180,754 | B1 | 5/2012 | Ershov |
| 8,214,310 | B2 | 7/2012 | Naphade et al. |
| 8,645,361 | B2 | 2/2014 | Poznanski et al. |
| 8,756,233 | B2 | 6/2014 | AbdAlmageed et al. |
| 9,465,833 | B2 | 10/2016 | Aravamudan et al. |
| 9,760,566 | B2 * | 9/2017 | Heck ...................... G06F 40/30 |
| 9,836,452 | B2 | 12/2017 | Robichaud et al. |
| 9,842,168 | B2 * | 12/2017 | Heck ................... G06F 16/9535 |
| 10,296,587 | B2 * | 5/2019 | Heck ...................... G06F 40/35 |
| 2003/0214523 | A1 | 11/2003 | Wang |
| 2005/0004905 | A1 | 1/2005 | Dresden |
| 2005/0149496 | A1 | 7/2005 | Mukherjee et al. |
| 2005/0182628 | A1 | 8/2005 | Choi |
| 2006/0136375 | A1 | 6/2006 | Cox et al. |
| 2006/0271364 | A1 * | 11/2006 | Mirkovic ................ G06F 40/40 704/E15.044 |
| 2007/0078658 | A1 | 4/2007 | Virji et al. |
| 2010/0023502 | A1 | 1/2010 | Marlow |
| 2010/0114944 | A1 | 5/2010 | Adler et al. |
| 2010/0138215 | A1 | 6/2010 | Williams |
| 2010/0306213 | A1 | 12/2010 | Taylor et al. |
| 2010/0312549 | A1 | 12/2010 | Akuwudike |
| 2011/0119302 | A1 | 5/2011 | Gorman et al. |
| 2011/0320186 | A1 | 12/2011 | Butters et al. |
| 2012/0084086 | A1 | 4/2012 | Gilbert et al. |
| 2014/0006012 | A1 | 1/2014 | Zhou et al. |
| 2014/0059030 | A1 | 2/2014 | Hakkani-Tur et al. |
| 2014/0163959 | A1 | 6/2014 | Hebert et al. |
| 2014/0236575 | A1 | 8/2014 | Tur et al. |
| 2014/0280087 | A1 * | 9/2014 | Isensee ............. G06F 17/30477 707/723 |
| 2014/0365209 | A1 | 12/2014 | Evermann |
| 2014/0365502 | A1 | 12/2014 | Haggar et al. |
| 2014/0365880 | A1 * | 12/2014 | Bellegarda .......... G06F 17/3097 715/261 |
| 2015/0026163 | A1 * | 1/2015 | Haggar ............. G06F 17/30654 707/723 |
| 2015/0039292 | A1 | 2/2015 | Suleman et al. |
| 2015/0242387 | A1 | 8/2015 | Rachevsky et al. |

FOREIGN PATENT DOCUMENTS

| | | |
|---|---|---|
| EP | 0631244 A2 | 12/1994 |
| JP | H0756954 A | 3/1995 |
| JP | 2011076264 A | 4/2011 |
| RU | 2352979 C2 | 4/2009 |
| WO | 2013010262 A1 | 1/2013 |

OTHER PUBLICATIONS

Wang, et al., "Modeling Action-level Satisfaction for Search Task Satisfaction Prediction", In Proceedings of the 37th International ACM SIGIR Conference on Research & Development in Information Retrieval, Jul. 6, 2014, 10 Pages.
"Invitation to Pay Additional Fees Issued in PCT Application No. PCT/US2015/067238", Mailed Date: May 4, 2016, 6 Pages.
"Final Office Action Issued in U.S. Appl. No. 14/586,395", dated Apr. 19, 2017, 12 Pages.
"Non-Final Office Action Issued in U.S. Appl. No. 14/586,395", dated Sep. 6, 2016, 13 Pages.
"Notice of Allowance Issued in U.S. Appl. No. 14/586,395", dated Aug. 2, 2017, 10 Pages.
"International Preliminary Report on Patentability Issued in PCT Application No. PCT/US2015/067238", dated Mar. 31, 2017, 12 Pages.
"International Search Report and Written Opinion Issued in PCT Application No. PCT/US2015/067238", dated Aug. 5, 2016, 19 Pages.
"Office Action Issued in Mexican Patent Application No. MX/a/2017/008583", dated Oct. 17, 2018, 4 Pages.
"Office Action Issued in Russian Patent Application No. 2017122991", dated Jul. 1, 2019, 7 Pages.
"Office Action Issued in Russian Patent Application No. 2017122991" dated Nov. 12, 2019, 8 Pages.
"First Office Action and Search Report Issued in Chinese Patent Application No. 201580070449.8", dated Nov. 22, 2019, 17 Pages.
"Office Action Issued in Japanese Patent Application No. 2017-535358", dated Nov. 20, 2019, 4 Pages.
"Office Action Issued in European Patent Application No. 15821005.4", dated Feb. 28, 2020, 7 Pages.
"Office Action Issued in Brazilian Patent Application No. 112017010222-6", dated May 14, 2020, 5 Pages.
"Office Action Issued in Australian Patent Application No. 2015374382", dated Jun. 15, 2020, 5 Pages.
"Second Office Action Issued in Chinese Patent Application No. 201580070449.8", dated Jul. 24, 2020, 17 Pages.
"Office Action Issued in Chinese Patent Application No. 201580070449.8", dated Jan. 20, 2021, 8 Pages.
"Office Action Issued in Indian Patent Application No. 201747019194", dated Mar. 3, 2021, 6 Pages.
"Office Action Issued in Chinese Patent Application No. 201580070449.8", dated Apr. 26, 2021, 6 Pages.
"Fourth Office Action Issued in Chinese Patent Application No. 201580070449.8", dated Sep. 6, 2021, 9 Pages.
"Office Action Issued in Canadian Patent Application No. 2968016", dated Nov. 16, 2021, 7 Pages.
Office Action Issued in Australia Patent Application No. 2020267218, dated Sep. 27, 2021, 4 Pages.
"Office Action Issued in Chinese Patent Application No. 201580070449.8", dated Jan. 26, 2022, 10 Pages.

* cited by examiner

DISCRIMINATING AMBIGUOUS EXPRESSIONS TO ENHANCE USER EXPERIENCE

CROSS-REFERENCE TO RELATED APPLICATIONS

This application is a continuation of U.S. patent application Ser. No. 14/586,395, now U.S. Pat. No. 9,836,452, filed on Dec. 30, 2014, titled "DISCRIMINATING AMBIGUOUS EXPRESSIONS TO ENHANCE USER EXPERIENCE", which application is incorporated herein by reference.

BACKGROUND

Language understanding applications (e.g., digital assistant applications) require at least some contextual language understanding for interpreting spoken language input. In this regard, digital assistant applications may have experience interpreting spoken language inputs having a specific domain and/or task. For example, a digital assistant application may provide accurate results when interpreting a spoken language input related to a calendar event. However, in scenarios where the digital assistant application does not know how to handle the spoken language input, a backend solution (e.g., the web) may be used to provide a user with results. It may be difficult to determine when to use the digital assistant application and when to use a backend solution for a given spoken language input. In some cases, deterministic hard-coded rules may be used to determine when to use the digital assistant application and when to use a backend solution to fulfill a user's request. The cost of crafting and implementing these rules, as well as evaluating their accuracy, is high. Additionally, hard-coded rules do not scale well for locale expansion (e.g., interpreting new and/or different languages). Furthermore, when it is determined to use a backend solution, the spoken language input is sent to the backend solution "as is" and a result is provided based on the received spoken language input. Consequently, as commonly known to the community, the hard-coded rules are "coarse-grained" and the overall user experience suboptimal.

It is with respect to these and other general considerations that embodiments have been made. Also, although relatively specific problems have been discussed, it should be understood that the embodiments should not be limited to solving the specific problems identified in the background.

SUMMARY

In summary, the disclosure generally relates to discriminating ambiguous expressions. More particularly, the disclosure relates to methods and systems for discriminating ambiguous expressions to enhance user experience. For example, a natural language expression may be received by a speech recognition component. The natural language expression may include at least one of words, terms, and phrases of text. A dialog hypothesis set from the natural language expression may be created by using contextual information. In some cases, the dialog hypothesis set has at least two dialog hypotheses. A plurality of dialog responses may be generated for the dialog hypothesis set. The dialog hypothesis set may be ranked based on an analysis of the plurality of the dialog responses. An action may be performed based on ranking the dialog hypothesis set.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. Aspects may be practiced as methods, systems or devices. Accordingly, aspects may take the form of a hardware implementation, an entirely software implementation or an implementation combining software and hardware aspects. The following detailed description is therefore not to be taken in a limiting sense, and the scope of the present disclosure is defined by the appended claims and their equivalents.

The present disclosure generally relates to using supervised and unsupervised machine learning techniques for discriminating ambiguous requests. Existing techniques for discriminating ambiguous requests rely on deterministic hard-coded rules that are costly to craft and implement. For example, pre-determined rules may be written and implemented in current systems based on data (e.g., spoken language inputs) received by the system over time to determine how to respond to spoken language inputs. However, using hard-coded rules to discriminate ambiguous requests is difficult to do with good confidence due to a natural overlap with multiple domains. Furthermore, using hard-coded rules to discriminate ambiguous requests may provide a suboptimal user experience. Accordingly, aspects described herein include machine learning based techniques for dynamically discriminating ambiguous requests. Such machine learning based techniques enable determining which user experience to use to best respond to a specific user spoken language input (e.g., request). For example, information from various sources may be used to dynamically convert an ambiguous request into a query that provides relevant results to the user. Dynamically converting an ambiguous request into a query that provides relevant results to the user based on information from various sources may result in a better user experience with the system and/or an application associated with the system (e.g., a digital assistant application). Additionally, discriminating ambiguous requests may reduce the number of clarifying requests and/or responses the system and/or application has to provide. As such, fewer computations may be required by a client and/or server computing device.

Figure 1:
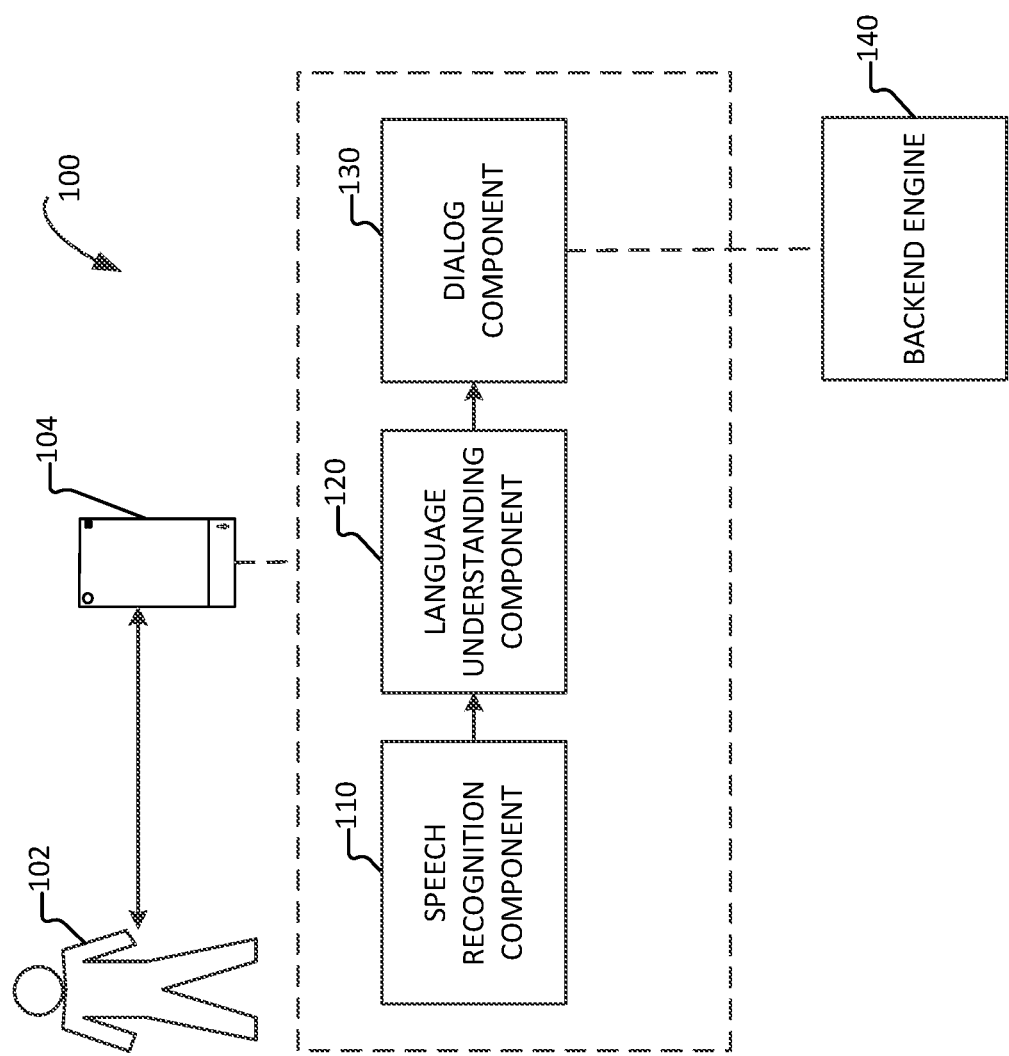
FIG. 1 illustrates an exemplary dynamic system implemented at a client computing device for discriminating ambiguous expressions, according to an example embodiment.

With reference to FIG. 1, one aspect of a dynamic system 100 for discriminating ambiguous request is illustrated. In aspects, the dynamic system 100 may be implemented on a client computing device 104. In a basic configuration, the client computing device 104 is a handheld computer having both input elements and output elements. The client computing device 104 may be any suitable computing device for implementing the dynamic system 100 for contextual language understanding. For example, the client computing device 104 may be at least one of: a mobile telephone; a smart phone; a tablet; a phablet; a smart watch; a wearable computer; a personal computer; a desktop computer; a laptop computer; etc. This list is exemplary only and should not be considered as limiting. Any suitable client computing device for implementing the dynamic system 100 for contextual language understanding may be utilized.

In aspects, the dynamic system 100 may include a speech recognition component 110, a language understanding component 120, a dialog component 130, and a backend engine 140. The various components may be implemented using hardware, software, or a combination of hardware and software. The dynamic system 100 may be configured to process natural language expressions. In this regard, the dynamic system 100 may facilitate discriminating ambiguous requests. In one example, a natural language expression may include phrases, words, and/or terms in the form of a spoken language input (e.g., a user query and/or request). In another example, a natural language expression may include phrases, words, and/or terms in the form of a textual language input (e.g., a user query and/or request). In this regard, the natural language expression may be ambiguous and/or have missing information. For example, the natural language expression, "how about tomorrow," is ambiguous when analyzed in isolation.

The dynamic system 100 may be configured to process natural language expressions in different scenarios. For example, the dynamic system 100 may process natural language expressions in single-turn scenarios and/or multi-turn scenarios. A single-turn scenario may be a scenario where a spoken language input/natural language expression is processed in isolation during a session between a user and the dynamic system 100. A single-turn scenario may indicate that only information from the currently processed natural language expression is utilized to discriminate ambiguous requests. A multi-turn scenario is a scenario where more than one spoken language input/natural language expression is processed during a session between a user 102 and the dynamic system 100. In some cases, each natural language expression may be interpreted as a turn during a session. A turn may include both the natural language expression and a response/action by the dynamic system 100. That is, a first turn may include both a natural language expression and a response/action by the dynamic system 100. In other aspects, a multi-turn scenario indicates that information from multiple turns of the session may be utilized to make a prediction and/or discriminate ambiguous requests. A session may include a conversation between a user and application (e.g., a digital assistant application) of the dynamic system 100. The session may start when the application is activated and a user starts speaking and end when the application is de-activated.

As discussed above, the dynamic system 100 may include a speech recognition component 110, a language understanding component 120, a dialog component 130, and a backend engine 140. In aspects, the speech recognition component 110 may include standard speech recognition techniques known to those skilled in the art such as "automatic speech recognition" (ASR), "computer speech recognition", and "speech to text" (STT). In some cases, the speech recognition component 110 may include standard text to speech techniques known to those skilled in the art such as "text to speech" (TTS). One skilled in the art would recognize that speech recognition component 110 may include one or more various different types of speech recognition and/or text recognition components. In some cases, the speech recognition component 110 is configured to receive a natural language expression and output a plurality of n-best representations of the received natural language expression. For example, the speech recognition component 110 may receive the natural language expression "is the five twenty on time," and output a first representation including, "is the five twenty on time," and a second representation including, "is BE five twenty on time." In this regard, there may be ambiguity regarding whether the natural language expression refers to a public transport service, for example, or a flight "BE520." The n-best representations may be generated using a single ASR, SST, or TTS, or using multiple ASRs, SSTs, or TTSs. The n-best representations of the natural language expression may be further processed to discriminate the ambiguity in the representations of the natural language expression, which is discussed in detail below.

In aspects, the language understanding component 120 may include standard spoken language understanding models such as support vector machines, conditional random fields and/or convolutional non-recurrent neural networks for training purposes. One skilled in the art would recognize that various different standard language understanding models such as the support vector machines, conditional random fields, and convolutional neural networks, can be employed by the different aspects disclosed herein. In this regard, the language understanding component 120 may be configured to receive n-best representations from the speech recognition component 110 and make predictions based on the received n-best representations from the speech recognition component 110. For example, the language understanding component 120 may perform domain and intent prediction (e.g., using the support vector machines) and slot tagging (e.g., using conditional random fields). In one aspect, domain prediction may include classifying the natural language expression into a supported domain of the language understanding component 120. Domain may refer to generally known topics such as places, reminder, calendar, weather, communication, and the like. For example, in the natural language expression, "show me driving directions to Portland," the language understanding component 120 may extract the feature, "Portland" and classify the natural language expression into the supported domain, "Places," of the language understanding component 120.

In one aspect, intent prediction may include determining intent of the user 102 via the natural language expression. For example, in the natural language expression, "show me driving directions to Portland," the language understanding component 120 may determine that the intent of the user 102 is an intent classification such as, for example "get_route." In one aspect, slot tagging may include performing slot detection on the natural language expression. In one case, slot detection may include filling slot types (e.g., slot types supported by the language understanding component 120) with semantically loaded words from the natural language expression. For example, in the natural language expression, "from 2 pm to 4 pm," slot tagging may include filling the slot type "start_time" with "2 pm" and the slot type "end_type" with "4 pm."

As discussed above, the dynamic system 100 may process the natural language expression in a variety of scenarios including both single-turn and multi-turn scenarios. In this regard, the language understanding component 120 may evaluate the natural language expression using information from the currently processed natural language expression and contextual information from the currently processed natural language expression. Contextual information may include information extracted from each turn in a session. For example, the information extracted may include the domain prediction, intent prediction, and slot types predicted (e.g., the results) from a previous turn (e.g., a previous natural language expression/request from the current session). In another case, the contextual information may include the response to a previous turn by the dynamic system 100. For example, the response to a previous turn may include how the dynamic system 100 responded to the previous request from a user (e.g., what the dynamic system output/said to the user), items located on a display of the client computing device 104, text located on the display of the client computing device 104, and the like. In another case, the contextual information may include client context. For example, client context may include a contact list on the client computing device 104, a calendar on the client computing device 104, GPS information (e.g., a location of the client computing device 104), the current time (e.g., morning, night, in a meeting, in a workout, driving, etc.), and the like. In another case, the contextual information may include knowledge content. For example, knowledge content may include a knowledge database that maps features from the natural language expression with stored data. As an example, "John Howie," which is the name of a restaurant in Bellevue, may be mapped to a restaurant in the knowledge database. In yet another case, the contextual information includes any combination of the above-discussed contextual information.

In aspects, the language understanding component 120 may perform domain and intent prediction (e.g., using the support vector machines) and slot tagging (e.g., using conditional random fields) using the contextual information described above. For example, a first turn of a session may include the natural language expression, "how is the weather tomorrow." In this example, the language understanding component 120 may predict the domain classification as "Weather." A second turn of the same session may include the natural language expression, "how about this weekend."

In this example, the language understanding component 120 may predict the domain classification as "Weather." For example, the language understanding component 120 may evaluate the first turn, "how is the weather tomorrow" and the first turn predicted domain classification "Weather," to predict the domain classification of the second turn, "how about this weekend." In this regard, based on the first turn of the same session being a request about the weather and having a "Weather" domain classification, the language understanding component 120 may predict that the expression "how about this weekend" is related to the first expression "how is the weather tomorrow," and therefore classify the domain as "Weather."

In another example, a first turn of a session may include the natural language expression, "show me driving directions to Portland." In this example, the language understanding component 120 may predict the domain classification as "Places," and the intent classification of the user as "get_route." A second turn of the same session may include the natural language expression, "how about Vancouver." In this example, the language understanding component 120 may predict the domain classification as "Places," and the intent classification of the user as "get_route." As illustrated, the language understanding component 120 uses contextual information from the first turn in the first session to predict the intent classification of the user 102 from the second turn in the first session, "how about Vancouver," as "get_route."

In yet another example, a first turn of a session may include the natural language expression, "create a meeting with Jason." In this example, the language understanding component 120 may predict the domain classification as "Calendar," and the intent classification of the user 102 as "create_meeting." A second turn of the same session may include the natural language expression, "from 2 pm to 4 pm." In this example, the language understanding component 120 may predict the domain classification as "Calendar," and the slot types as "start_time=2 pm" and "end_time=4 pm." As illustrated, the language understanding component 120 uses contextual information from the first turn in the first session to predict the slot type for the second turn in the first session "from 2 pm to 4 pm" as "start_time=2 pm" and "end_time=4 pm."

In aspects, the predications determined by the language understanding component 120 may be sent to the dialog component 130 for processing. In this regard, the dialog component 130 may be configured to create a dialog hypothesis set for each natural language expression and determine what response/action to take for each natural language expression, which will be described in detail below relative to FIG. 3. The dialog component 130 may receive a combination of information for processing. For example, the dialog component 130 may receive input context (e.g., contextual information), the natural language expressions received by the dynamic system 100, and the predictions made by the language understanding component 120. The input context may include client information (e.g., the type of device of the client), and the contextual information discussed above.

When the dialog component 130 receives the combination of information for processing, the dialog component 130 may create a dialog hypothesis set. The dialog hypothesis set may include at least two dialog hypotheses based on the natural language expression. In some cases, the dialog hypothesis set may include any number of dialog hypotheses. In one case, a dialog hypothesis may be created based on the prediction received from the language understanding component 120. For example, the language understanding component 120 may predict that the natural language expression, "create a meeting with Jason," is a request to create a meeting with Jason and is categorized in the "Calendar" domain. As such, the dialog component 130 may create a similar hypothesis and send the natural language expression, "create a meeting with Jason" to a Calendar domain component for processing. In another case, a dialog hypothesis may be created based on the combination of information (e.g., contextual information) received from other components in the dynamic system 100. For example, the language understanding component 120 may not handle the natural language expression, "how did my football team do yesterday." As such, the dialog component 130 may create a similar hypothesis and send the natural language expression, "how did my football team do yesterday," to a web domain component for processing. The web domain component may utilize the combination of information to create a web domain hypothesis set. The web domain hypothesis set may include a plurality of queries created using the natural language expression and the combination of information such that each query of the plurality of queries includes a different expression, which will be described in detail below in FIG. 3.

In aspects, the dialog component 130 may determine what response/action to take for each natural language expression. In this regard, the dialog component 130 may rank the hypotheses in the dialog hypothesis set by analyzing responses that are returned in response to performing a query using the hypotheses, which will be described in detail relative to FIG. 3. The query may be performed by using a backend engine 140. The backend engine 140 may include any backend engine suitable to receive and process text and/or keyword natural language expressions/queries. In one example, the backend engine 140 may include a search engine such as Bing, Google, Yahoo, and the like. In another example, the backend engine 140 may include a domain specific search engine such as places, reminder, calendar, weather, communication, and the like. In one case, the backend engine 140 may be located at the dialog component 130. In other cases, the backend engine 140 may be located at a server computing device that is in communication with the dialog component 130. In other cases, portions of the backend engine 140 may be located at the dialog component 130 and portions of the backend engine 140 may be located at the server computing device in any combination.

Figure 2:
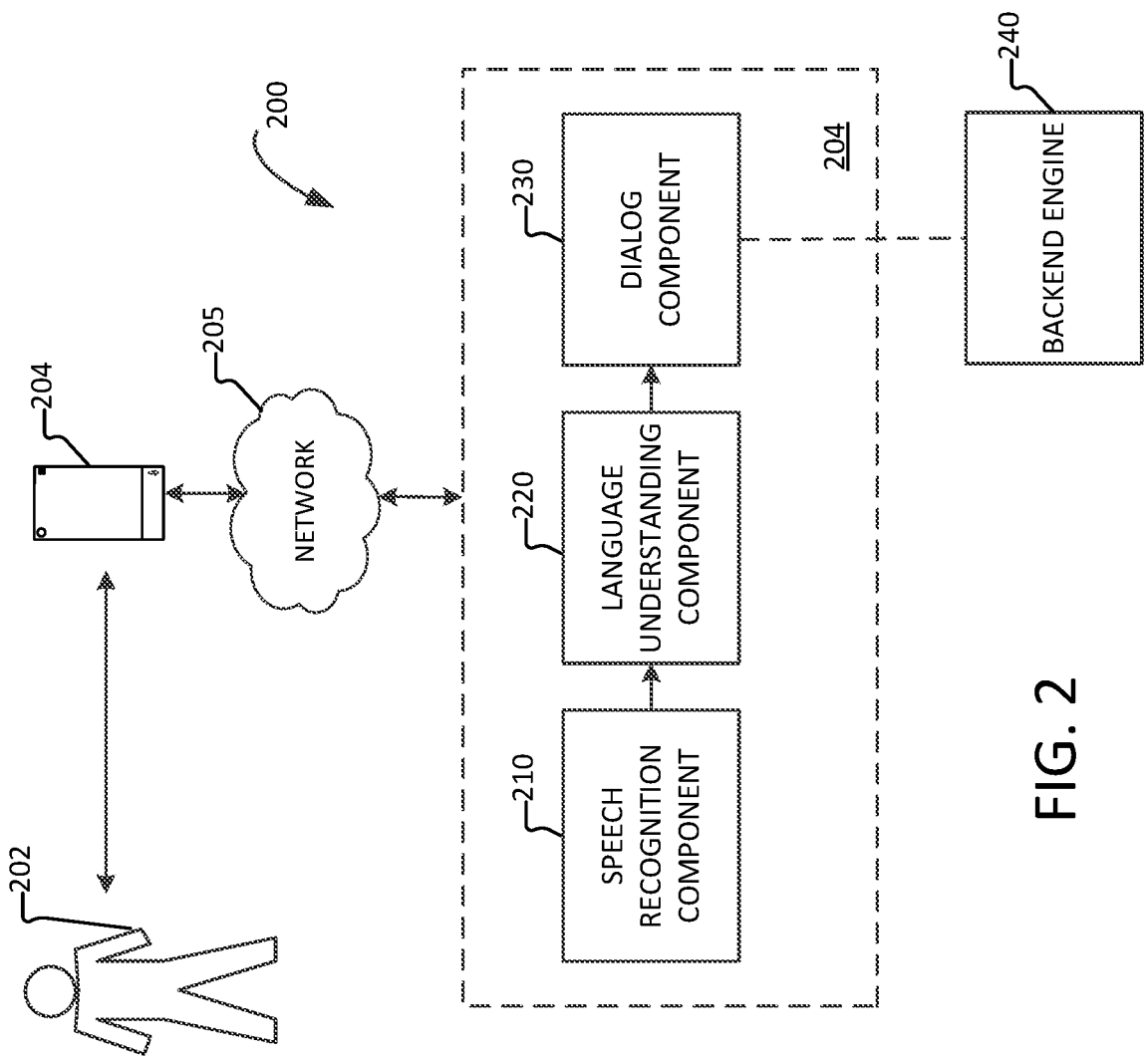
FIG. 2 illustrates an exemplary dynamic system implemented at a server computing device for discriminating ambiguous expressions, according to an example embodiment.

FIG. 2 illustrates a dynamic system 200 for discriminating ambiguous requests according to one or more aspects disclosed herein. In aspects, the dynamic system 200 may be implemented on a server computing device 204. The server computing device 204 may provide data to and from the client computing device 104 through a network 205. In one aspect, the network 205 is a distributed computing network, such as the Internet. In aspects, that dynamic system 200 may be implemented on more than one server computing device 204, such as a plurality of server computing devices 204. As shown in FIG. 2, the dynamic system 200 may include a speech recognition component 210, a language understanding component 220, a dialog component 230, and a backend engine 240. The dynamic system 200 may be configured to process natural language expressions. In this regard, the dynamic system 200 may discriminate ambiguous requests. The speech recognition component 210, the language understanding component 220, the dialog component 230, and the backend engine 240 may be configured similar to the speech recognition component 110, the language understanding component 120, the dialog component 130, and the backend engine 140 described above relative to FIG. 1. In this regard, the dynamic system 200 may include all the functionality described in the above aspects relative to the dynamic system 100 of FIG. 1.

As discussed above, the server computing device 204 may provide data to and from the client computing device 104 through the network 205. The data may be communicated over any network suitable to transmit data. In some aspects, the network 205 is a computer network such as the internet. In this regard, the network 205 may include a Local Area Network (LAN), a Wide Area Network (WAN), the Internet, wireless and wired transmission mediums. One of skill in the art will appreciate that other types of networks may be employed with the aspects disclosed herein. In this regard, the natural language expression may be received at the client computing device 104 and transmitting over the network 205 for processing by the statistical system 200 at the server computing device 204. It is appreciated that the dynamic system (e.g., dynamic system 100 and dynamic system 200) components (e.g., the speech recognition component 110/210, the language understanding component 120/220, the dialog component 130/230, and the backend engine 140/240) may be located at the client computing device 104, the server computing device 204, and/or both the client computing device 104 and the server computing device 204 in any combination. For example, in one aspect, the client computing device 104 may include the speech recognition component 110 and the language understanding component 120 and the server computing device 204 may include the dialog component 230 and the backend engine 240 in one configuration. This is exemplary only and should not be considered as limiting. Any suitable combination of dynamic system components at the client computing device 104 and the server computing device 204 for discriminating ambiguous requests may be utilized.

Figure 3:
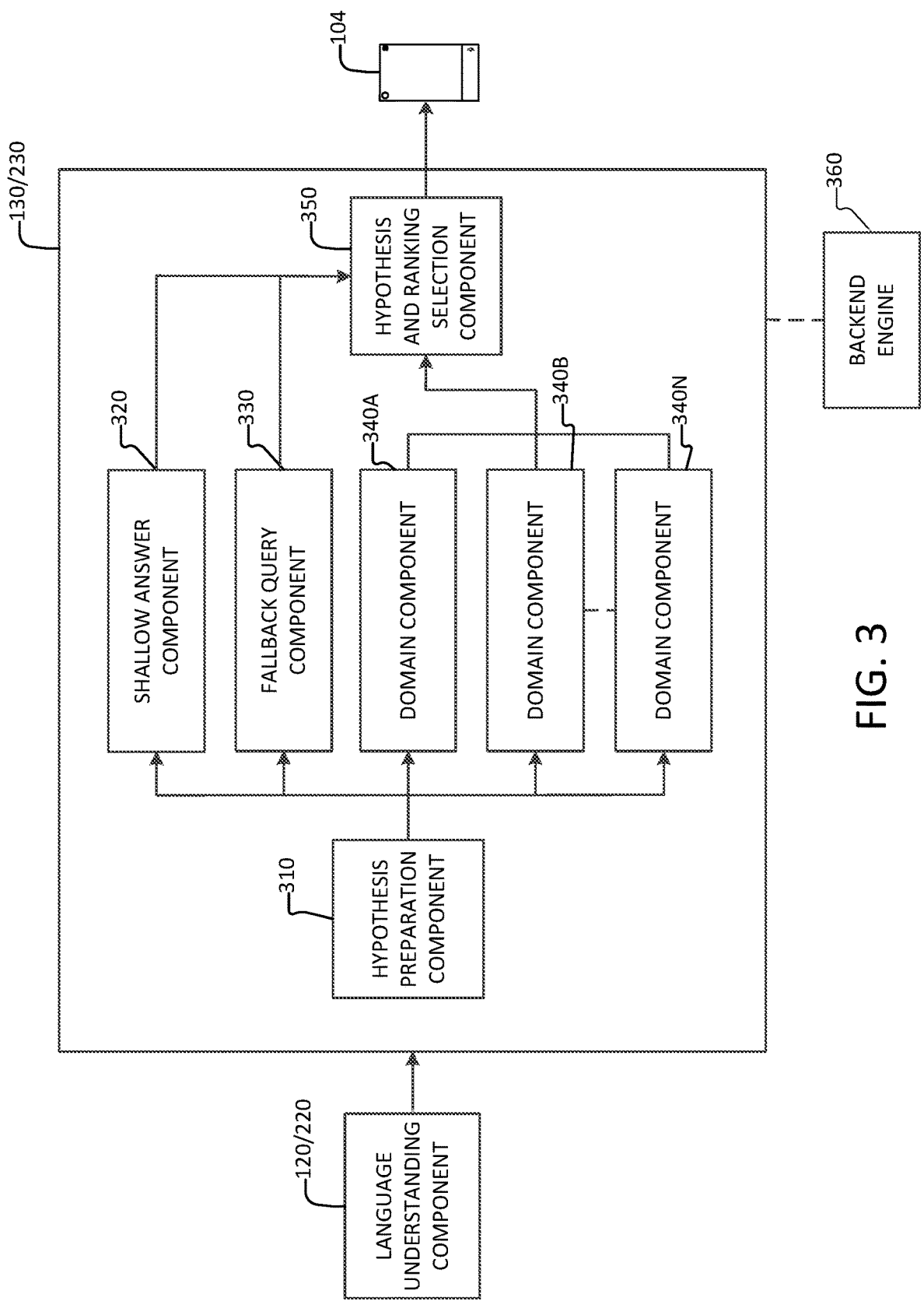
FIG. 3 illustrates an exemplary block diagram of a dialog component for discriminating ambiguous expressions, according to an example embodiment.

FIG. 3 illustrates an exemplary block diagram of a dialog component 130/230 for discriminating ambiguous requests, according to one or more aspects of the present disclosure. As discussed above, the dialog component 130 may be configured to create a dialog hypothesis set for each natural language expression and determine what response/action to take for each natural language expression, for example. In this regard, as illustrated in FIG. 3, the dialog component 130/230 may include a hypothesis preparation component 310, an shallow answer component 320, a fallback query component 330, domain components 340A-340N, a hypothesis and ranking selection component (HRS) 350, and a backend engine 360. As discussed above, the dialog component 130 may receive a combination of information for processing. For example, the dialog component 130 may receive input context, the natural language expressions received by the dynamic system 100, and the predictions made by the language understanding component 120 (e.g., the contextual information as described above). The input context may include client information (e.g., the type of device of the client), and the contextual information discussed above. In this regard, the hypothesis preparation component 310, the shallow answer component 320, the fallback query component 330, the domain components 340A-340N, and the hypothesis and ranking selection component (HRS) 350 may be configured to receive the combination of information for processing.

In one aspect, the hypothesis preparation component 310 is configured to create a hypothesis set based on the received information. As discussed above, the dialog hypothesis set may include at least two dialog hypotheses based on the natural language expression. In some cases, the dialog hypothesis set may include any number of dialog hypotheses. In one case, a dialog hypothesis may be created based on the prediction received from the language understanding component 120. For example, the language understanding component 120 may predict that the natural language expression, "create a meeting with Jason," is a request to create a meeting with Jason and is categorized in the "Calendar" domain. As such, the hypothesis preparation component 310 may create a similar hypothesis and send the natural language expression, "create a meeting with Jason" to a Calendar domain component for processing. In another case, a dialog hypothesis may be created based on the combination of information received from other components in the dynamic system 100. For example, the language understanding component 120 may not handle the natural language expression, "how did my football team do yesterday." As such, the hypothesis preparation component 310 may create a similar hypothesis and send the natural language expression, "how did my football team do yesterday," to a web domain component for processing.

In the example where the language understanding component 120 does not handle the natural language expression and sends the natural language expression to a web domain component for processing, the web domain component may create a fallback query to be sent to the backend engine 360. For example, a first turn of a session may include the natural language expression a session may include "find restaurants near me." The natural language expression, "find restaurants near me," may be handled by a Place domain component. A second turn of the session may include the natural language expression, "show the Italian ones only." The natural language expression, "show the Italian ones only" may be handled by the Place domain component. A third turn of the session may include the natural language expression, "which ones are kids friendly." The Place domain component may not be able to handle the natural language expression, "which ones are kids friendly." As such, the dialog component 130/230 may create a fallback query to be handled by the backend engine 360. The dialog component 130/230 may create a query to facilitate improved search results generated by the backend engine 360. For example, the dialog component 130/230 may create a first query by concatenating all previous and current turns of a session. Using the example described above, the first query may be, "find restaurants near me show the Italian ones which ones are kids friendly." In another example, the dialog component 130/230 may create a second query by concatenating a stop-word removal analysis performed from the previous and current turns of a session. Using the same example as described above, the second query may be, "restaurants near me show Italian ones only kids friendly." In yet another example, the dialog component 130/230 may create a third query by concatenating semantic entities extracted from the previous and current turns of a session. In one case, a semantic entity may be any portion of the natural language expression, classifications of the natural language expression and/or results from processing the natural language expression that have been determined to have meaning. Using the same example as described above, the third query may be, "restaurant Bellevue WA Italian Food Family." In this regard, when the dialog component 130/230 uses the backend engine 360 to perform a search, a query other than the natural language expression "as is" is created to facilitate more relevant results being returned.

In one aspect, the domain components 340A-340N may include domains handled by the digital assistant application and a web domain. The domains handled by the digital assistant application may include places, reminder, calendar, weather, communication, and the like. For example, domain component 340A may be a calendar domain component and may process calendar domain hypotheses. In another example, domain component 340B may be a weather domain component and may process weather domain hypotheses. In yet another example, domain component 340N may be a web domain component and may process web domain hypotheses. It is appreciated that the domain components 340A-340N may be any type of domain components and the dialog component 130/230 may include any number of domain components 340A-340N. In the example where domain component 340A is a calendar domain component, when domain component 340A receives a calendar domain hypothesis from the hypothesis preparation component 310, the domain component 340A may schedule a meeting based on the hypothesis. For example, if the calendar domain hypothesis is, "schedule a meeting with Jason from 2 pm to 4 pm tomorrow," the domain component 340A may add this meeting to the user's calendar for tomorrow from 2 pm-4 pm.

In another example, when the hypothesis is a web domain hypothesis, the web domain component 340N may receive the web domain hypothesis and the combination of information from different sources. In this regard, the web domain component 340N may use the combination of information from different sources to discriminate ambiguous information in the web domain hypothesis. In one example, a web domain hypothesis may be, "who do the Broncos play at that time." Instead of the web domain component 340N performing a search using the web domain hypothesis/query, "who do the Broncos play at that time," the web domain component 340N may use the combination of information received to create a web domain hypothesis set of created web domain hypotheses. In one example, the web domain component 340N may use a previous turn from the current session to create the web domain hypothesis set. For example, the first turn of the current session may be, "what is the weather like tomorrow." In this regard, the web domain component 340N may use the first turn and the determined slot type, "time=tomorrow," to create a first created web domain hypothesis such as, "who do the Broncos play tomorrow." As illustrated, the web domain component 340N replaced the ambiguous phrase, "at that time," with the determined slot type, "time=tomorrow." In another example, the web domain component 340N may combine the first turn of the current session with web domain hypothesis to create a second created web domain hypothesis, "what is the weather like tomorrow who do the Broncos play at that time." In yet another example, the web domain component 340N may combine only semantic entities from the first turn and current web domain hypothesis to create a third created web domain hypothesis, "weather tomorrow Broncos."

In some aspects, the web domain hypothesis set may be sent to the shallow answer component 320. The shallow answer component 320 may provide answers for each of the web domain hypotheses in the web domain hypothesis set. For example, each web domain hypothesis may be sent to the shallow answer component 320 to perform a query using the web domain hypothesis. In some cases, the answers for each of the web domain hypotheses may include specialized results for query types that are frequency received. For example, a frequent query type may include queries about the weather. In this example, the answers may include specialized results relating the weather. As such, when the shallow answer component 320 performs a query using the web domain hypothesis, the answers returned by the shallow answer component 320 may be based on the specialized results. For example, if the web domain hypothesis includes terms/entities that are frequently queried, the answers returned may include specialized results. In another example, if the web domain hypothesis does not include terms/entities that are frequently queried, the answers returned may not include specialized results (e.g., the results returned may not be useful). In this regard, the answers from the shallow answer component 320 may be indicative of which web domain hypotheses in the web domain hypothesis set return the best/most relevant results.

In one case, the results for each web domain hypothesis may be reviewed by a human to determine which result is the best. In this regard, the HRS component 350 may learn which features from a domain hypothesis correlate with the most relevant search results. For example, the features extracted for the domain hypothesis may include confidence scores, the number of results returned (e.g., if any), the presence or absence of specialized results, etc. As such, when a human determines the most relevant results for a domain hypothesis of a set of domain hypotheses, the HRS component 350 may learn how to use the features associated with the domain hypothesis that generates the most relevant results.

In another case, logged queries and their corresponding search results may be compared with the results of each web domain hypothesis. For example, using the example described above, a first turn of a session may be, "what is the weather like tomorrow." A second turn of the session may be, "Who do the Broncos play against at that time." The dialog component 130 may not be able to handle the second turn, "Who do the Broncos play against at that time," and may send this query to the backend engine 360. The backend engine 360 may not be able to discriminate the ambiguity, "at that time." In this regard, the user may have to re-query and say something like, "Who do the Broncos play against tomorrow." The dialog component 130 may send this query to the backend engine 360 and get relevant results back. These sessions of natural language expressions and their corresponding query results may be logged. As such, the HRS component 350 may analyze the logged data to determine when two turns of a session are very similar and when a turn of a session is a re-query of the session. For example, the HRS component 350 may identify lexical similarities between the two turns of the session. In another example, the HRS component 350 may identify that the number and/or quality of results of a second turn are better than a first turn. The more relevant results together with the lexical similarities may indicate that the turn is a re-query. As such, the HRS component 350 may determine what information/features should be carried over from a previous turn to a current turn to get relevant search results. That is, the HRS component 350 may learn what features produce results equivalent to the results produced for the re-query of the session. As such, machine learning techniques are used to determine what information to carry over from a previous turn to a current turn for providing relevant search results. In some cases, machine learning techniques may include artificial neural networks, Bayesian classifiers, and/or genetically derived algorithms, which have been developed through training with annotated training sets.

In aspects, the HRS component 350 may include ranking techniques such as an "N-best" list, a priority queue, a Gaussian distribution, and/or a histogram (e.g., a histogram identifying trends in the hypothesis scores of the respective dialog hypotheses). As discussed above, the HRS component 350 may extract features from the dialog hypotheses of the dialog hypothesis set and score and rank the features. In one case, the features extracted from the dialog hypotheses may include at least a confidence score for the predicted domain classification, a confidence score for the predicted intent classification, and a slot count for the predicted slot types. In another case, the features extracted from the dialog hypotheses may include features associated with the dialog hypotheses. For example, the extracted features may include the number of web results returned, the number of deep links returned, the number of answers triggered, and the number of answers suppressed. In yet another case, the features extracted from the dialog hypotheses may include a word count from the natural language expression, the text from the natural language expression, and the combined text from multiple turns in a session. It is appreciated that any combination of the features as described herein may be extracted from the dialog hypotheses.

In one case, the scores may be calculated and ranked using discriminative approaches based on a conditional probability distribution among the dialog hypotheses. In another case, the scores may be calculated and ranked using generative approaches involving a joint probability distribution of potential dialog hypotheses. As discussed above, the HRS component 350 may receive the dialog hypotheses from the domain components 340A-340N, shallow answers from the shallow answer component 320, the combination of information from different sources, and results from the backend engine 360. In this regard, the features extracted from the dialog hypotheses are scored and ranked by analyzing the results received for each dialog hypothesis. For example, if it is determined that a first dialog hypothesis returns more relevant results than a second dialog hypothesis, the features extracted from the first dialog hypothesis will be scored and ranked higher than the features from the second dialog hypothesis.

In some cases, the HRS component 350 may calculate a score for two dialog hypotheses that is similar. As such, there may be an ambiguity as to which dialog hypothesis should be ranked the highest. In the case of ambiguity, a fallback query may be used to discriminate the ambiguity. For example, the fallback query component 330 may include a set of fallback queries that can be used to discriminate ambiguities. For example, a fallback query may include a query such as, "sorry, I didn't hear you well," "sorry, I don't understand what you mean," and the like. In other cases, when there is an ambiguity as to which dialog hypothesis should be ranked the highest, the HRS component 350 may decide to pick the dialog hypothesis with the highest score, even if the difference is very small. In other cases, when there is an ambiguity as to which dialog hypothesis should be ranked the highest, the HRS component 350 may send a disambiguation question to a user of the client computing device 104 such as, "I'm not sure what you want to do, do you want to look up the opening hours of 5 Guys Burger restaurant?" If the user answers yes, the HRS component 350 may rank the dialog hypothesis associated with the answer as the highest. In the user answers no, the HRS component 350 may send a generic web search query to the backend engine 360. In another case, when there is an ambiguity as to which dialog hypothesis should be ranked the highest, the HRS component 350 may ask the user to disambiguate between the two dialog hypotheses. For example, the HRS component 350 may send a question to the user of the client computing device 104 *a* questions such as, "please tell me what's closer to what you mean: "weather Broncos tomorrow," or "who do the Broncos play at that time tomorrow."

Figure 4:
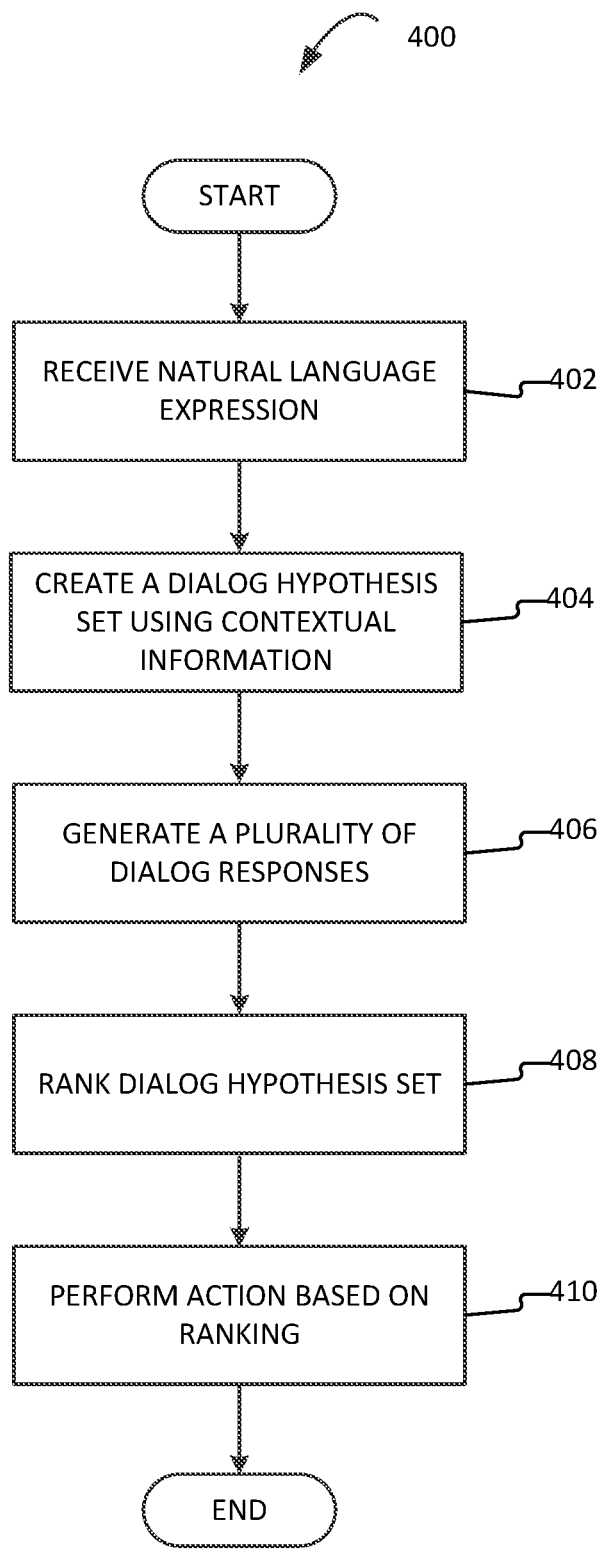
FIG. 4 illustrates an exemplary method for discriminating ambiguous expressions, according to an example embodiment.

FIG. 4 illustrates a method for discriminating ambiguous requests according to one or more embodiments of the present disclosure. Method 400 begins at operation 402 where a natural language expression is received. For example, the natural language expression may be received by the dynamic system for processing to determine the intent and/or ultimate goal of a user of a digital assistant application, for example. In one example, a natural language expression may include phrases, words, and/or terms in the form of a spoken language input (e.g., a user query and/or request). In this regard, the natural language expression may be ambiguous and/or have missing information. For example, the natural language expression, "how about tomorrow," is ambiguous when analyzed in isolation.

When a natural language expression is received at the dynamic system, flow proceeds to operation 404 where a dialog hypothesis set is created using contextual information. In one case, contextual information may include information extracted from each turn in a session. For example, the information extracted may include the domain prediction, intent prediction, and slot types predicted (e.g., the results) from a previous turn (e.g., a previous natural language expression/request from the current session). In another case, the contextual information may include the response to a previous turn by the dynamic system. For example, the response to a previous turn may include how the dynamic system responded to the previous request from a user (e.g., what the dynamic system output/said to the user), items located on a display of the client computing device, text located on the display of the client computing device, and the like. In another case, the contextual information may include client context. For example, client context may include a contact list on the client computing device, a calendar on the client computing device, GPS information (e.g., a location of the client computing device), the current time (e.g., morning, night, in a meeting, in a workout, driving, etc.), and the like. In another case, the contextual information may include knowledge content. For example, knowledge content may include a knowledge database that maps features from the natural language expression with stored data. As an example, "John Howie" may be mapped to a restaurant in the knowledge database. In this regard, a plurality of dialog hypotheses may be generated for the received natural language expression such that each dialog hypothesis consists of a different expression including a variety of features from the contextual information.

After the dialog hypothesis set is created using contextual information, flow proceeds to operation 406 where a plurality of dialog responses are generated for the dialog hypothesis set. For example, each dialog hypothesis in the dialog hypothesis set may have a corresponding set of query results. In one case, the plurality of dialog responses may be generated by sending the dialog hypotheses to a web backend engine. In another case, the plurality of dialog responses may be generated by domain specific components. For example, the dialog hypotheses may include features indicating a weather domain. In this case, the dialog hypotheses may be sent to a weather domain backend engine. In another case, the plurality of dialog responses may be generated by domain specific components and a web backend engine. In this regard, the plurality of responses may include results from both the domain specific component and the web backend engine.

When the plurality of dialog responses are generated for the dialog hypothesis set, flow proceeds to operation 408 where the dialog hypothesis set is ranked. For example, features may be extracted from the dialog hypotheses in the dialog hypothesis set. A score for the extracted features may be calculated. In this regard, the extracted features may be ranked based on the calculated score. In turn, it may be determined which dialog hypothesis in the dialog hypothesis set returns the most relevant results. In other cases, it may be determined which backend engine for the highest ranked dialog hypothesis is the best backend engine to use for generating results. In one case, the features extracted from the dialog hypotheses are scored and ranked by analyzing the results received for each dialog hypothesis. For example, if it is determined that a first dialog hypothesis returns more relevant results than a second dialog hypothesis, the features extracted from the first dialog hypothesis will be scored and ranked higher than the features from the second dialog hypothesis.

When the dialog hypothesis set is ranked, flow proceeds to operation 410 where an action based on the ranking is performed. In one case, the action performed may include using the highest ranked dialog hypothesis to query a web backend engine for results and sending the results to the user of the client computing device. In some examples, the user of the client computing device can identify the query used to obtain the search results. As such, the user may see that the query used to obtain the search results is different than the user's original natural language expression/request and may include features extracted from the user's previous request in the same session. In other cases, there may be an ambiguity as to which dialog hypothesis should be ranked the highest. In this case, the action performed may include using a fallback query. For example, a fallback query may include a query such as, "sorry, I didn't hear you well," "sorry, I don't understand what you mean," and the like. In other cases, the action performed may include sending a generic web search query to a backend engine.

Figure 5:
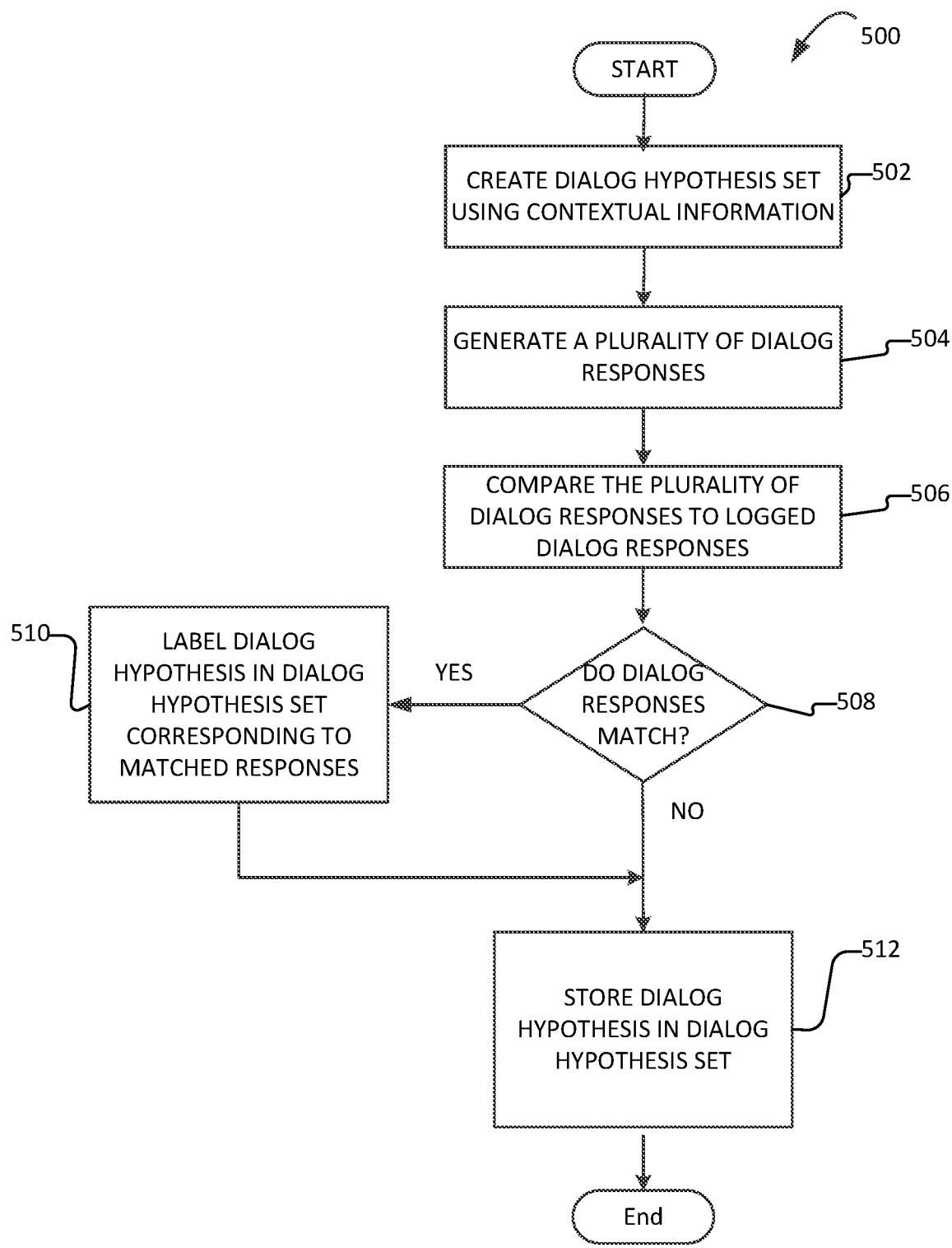
FIG. 5 illustrates an exemplary method for training a dialog component to discriminate ambiguous expressions, according to an example embodiment.

FIG. 5 illustrates a method for training a dialog component to discriminate ambiguous requests, according to one or more embodiments of the present disclosure. Method 500 begins at operation 502 where a dialog hypothesis set is created using contextual information. In one case, contextual information may include information extracted from each turn in a session. For example, the information extracted may include the domain prediction, intent prediction, and slot types predicted (e.g., the results) from a previous turn (e.g., a previous natural language expression/request from the current session). In another case, the contextual information may include the response to a previous turn by the dynamic system. For example, the response to a previous turn may include how the dynamic system responded to the previous request from a user (e.g., what the dynamic system output/said to the user), items located on a display of the client computing device, text located on the display of the client computing device, and the like. In another case, the contextual information may include client context. For example, client context may include a contact list on the client computing device, a calendar on the client computing device, GPS information (e.g., a location of the client computing device), the current time (e.g., morning, night, in a meeting, in a workout, driving, etc.), and the like. In another case, the contextual information may include knowledge content. For example, knowledge content may include a knowledge database that maps features from the natural language expression with stored data. As an example, "John Howie" may be mapped to a restaurant in the knowledge database. In this regard, a plurality of dialog hypotheses may be generated for the received natural language expression such that each dialog hypothesis consists of a different expression including a variety of features from the contextual information.

After the dialog hypothesis set is created using contextual information, flow proceeds to operation 504 where a plurality of dialog responses are generated for the dialog hypothesis set. For example, each dialog hypothesis in the dialog hypothesis set may have a corresponding set of query results. In one case, the plurality of dialog responses may be generated by sending the dialog hypotheses to a web backend engine. In another case, the plurality of dialog responses may be generated by domain specific components. For example, the dialog hypotheses may include features indicating a weather domain. In this case, the dialog hypotheses may be sent to a weather domain backend engine. In another case, the plurality of dialog responses may be generated by domain specific components and a web backend engine. In this regard, the plurality of responses may include results from both the domain specific component and the web backend engine.

When the plurality of dialog responses have been generated, flow proceeds to operation 506 where the plurality of dialog responses are compared with a plurality of logged dialog responses. In one case, logged responses may include responses generated from a natural language expression (as opposed to responses generated from a created dialog hypothesis). For example, a first turn of a session may include the natural language expression, "what's the weather like for tomorrow," and a second turn of the session may include the natural language expression, "who do the Broncos play against at that time." In this case, a user may have to re-query to get relevant results. As such, a third turn of the session may include the natural language expression, "who do the Broncos play against tomorrow." All the data from the session may be logged. For example, the first turn, second turn, and third turn and their corresponding responses may be logged. As such, in one example, the results from the third turn where the user had to re-query may be compared with the results of a dialog hypothesis to determine a similarity between the results.

At operation 508, it is determined which of the plurality of dialog responses match the logged dialog responses. When it is determined that a dialog response matches a logged response, flow proceeds to operation 510 where the dialog hypothesis corresponding to the dialog response that matches the logged response is labeled. For example, the label may indicate to the dialog component that the features carried over from a previous turn to create the dialog hypothesis are good features to carry over. That is, carrying over those features may facilitate generating relevant responses. In one example, the label may be a "true" label. In some cases, more than one dialog hypothesis may be labeled. For example, there may be more than one dialog response that matches a logged response and/or a plurality of logged dialog responses. In this case, the dialog hypotheses corresponding with the dialog responses that match the logged dialog response and/or the plurality of logged dialog responses may be labeled. After the dialog hypothesis corresponding to the dialog response that matches the logged response is labeled, the dialog hypothesis may be stored (e.g., operation 512). When it is determined that a dialog response does not match a logged response, flow proceeds to operation 512 where the dialog hypothesis corresponding to the dialog responses that don't match the logged responses are stored.

Figure 6:
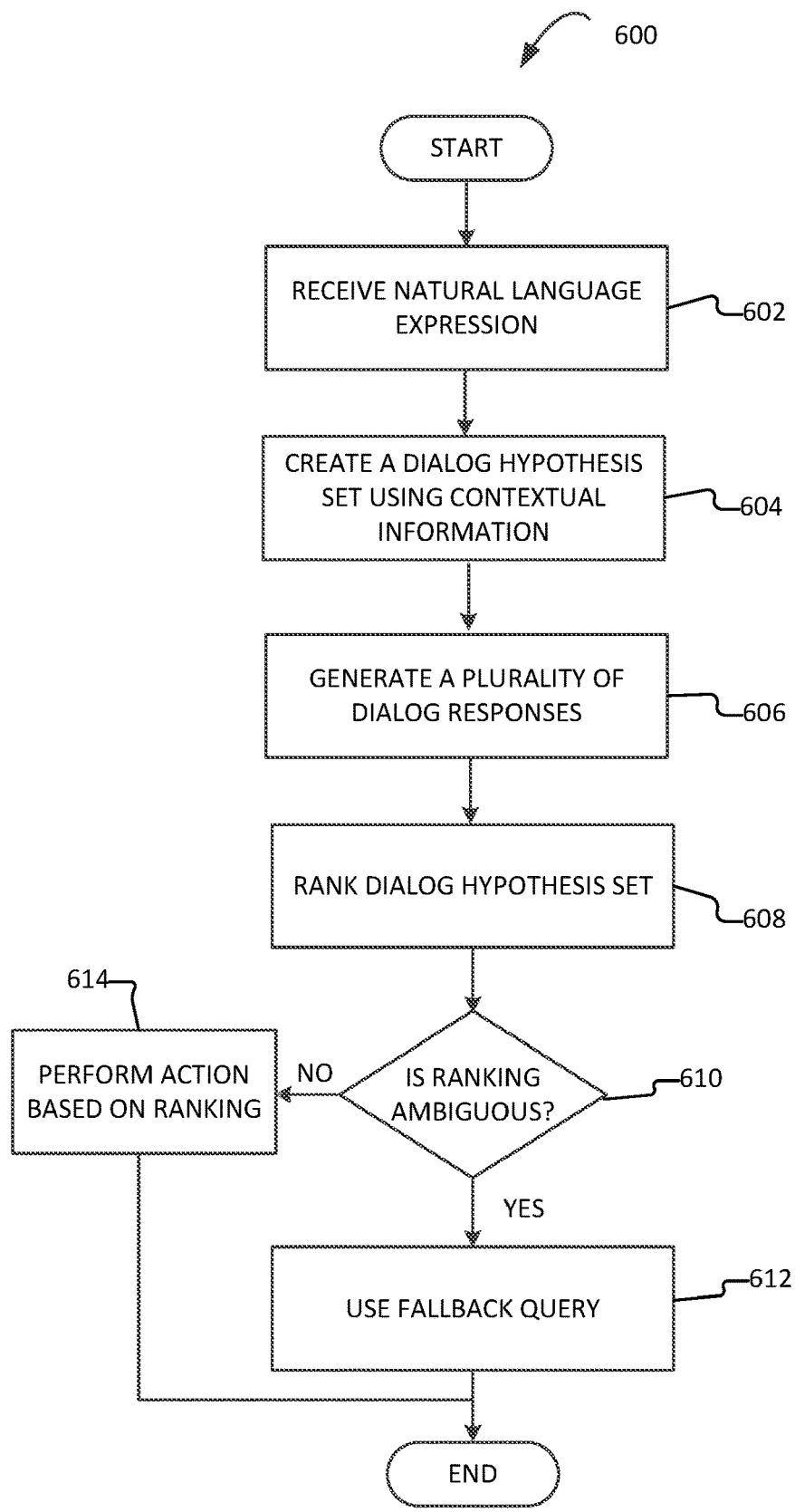
FIG. 6 illustrates an exemplary method for discriminating ambiguous expressions, according to an example embodiment.

FIG. 6 illustrates an exemplary method for discriminating ambiguous requests, according to one or more aspects of the present disclosure. Method 600 begins at operation 602 where a natural language expression is received. For example, the natural language expression may be received by the dynamic system for processing to determine the intent and/or ultimate goal of a user of a digital assistant application, for example. In one example, a natural language expression may include phrases, words, and/or terms in the form of a spoken language input (e.g., a user query and/or request). In this regard, the natural language expression may be ambiguous and/or have missing information. For example, the natural language expression, "how about tomorrow," is ambiguous when analyzed in isolation.

When a natural language expression is received at the dynamic system, flow proceeds to operation 604 where a dialog hypothesis set is created using contextual information. In one case, contextual information may include information extracted from each turn in a session. For example, the information extracted may include the domain prediction, intent prediction, and slot types predicted (e.g., the results) from a previous turn (e.g., a previous natural language expression/request from the current session). In another case, the contextual information may include the response to a previous turn by the dynamic system. For example, the response to a previous turn may include how the dynamic system responded to the previous request from a user (e.g., what the dynamic system output/said to the user), items located on a display of the client computing device, text located on the display of the client computing device, and the like. In another case, the contextual information may include client context. For example, client context may include a contact list on the client computing device, a calendar on the client computing device, GPS information (e.g., a location of the client computing device), the current time (e.g., morning, night, in a meeting, in a workout, driving, etc.), and the like. In another case, the contextual information may include knowledge content. For example, knowledge content may include a knowledge database that maps features from the natural language expression with stored data. As an example, "John Howie" may be mapped to a restaurant in the knowledge database. In this regard, a plurality of dialog hypotheses may be generated for the received natural language expression such that each dialog hypothesis consists of a different expression including a variety of features from the contextual information.

After the dialog hypothesis set is created using contextual information, flow proceeds to operation 606 where a plurality of dialog responses are generated for the dialog hypothesis set. For example, each dialog hypothesis in the dialog hypothesis set may have a corresponding set of query results. In one case, the plurality of dialog responses may be generated by sending the dialog hypotheses to a web backend engine. In another case, the plurality of dialog responses may be generated by domain specific components. For example, the dialog hypotheses may include features indicating a weather domain. In this case, the dialog hypotheses may be sent to a weather domain backend engine. In another case, the plurality of dialog responses may be generated by domain specific components and a web backend engine. In this regard, the plurality of responses may include results from both the domain specific component and the web backend engine.

When the plurality of dialog responses are generated for the dialog hypothesis set, flow proceeds to operation 608 where the dialog hypothesis set is ranked. For example, features may be extracted from the dialog hypotheses in the dialog hypothesis set. A score for the extracted features may be calculated. In this regard, the extracted features may be ranked based on the calculated score. In turn, it may be determined which dialog hypothesis in the dialog hypothesis set returns the most relevant results. In other cases, it may be determined which backend engine for the highest ranked dialog hypothesis is the best backend engine to use for generating results. In one case, the features extracted from the dialog hypotheses are scored and ranked by analyzing the results received for each dialog hypothesis. For example, if it is determined that a first dialog hypothesis returns more relevant results than a second dialog hypothesis, the features extracted from the first dialog hypothesis will be scored and ranked higher than the features from the second dialog hypothesis.

At operation 610, it is determined whether the ranking of the dialog hypothesis set is ambiguous. For example, two or more dialog hypotheses may have a similar score such that there is ambiguity regarding the dialog hypothesis with the highest score. When it is determined that the ranking of the dialog hypothesis set is ambiguous, flow proceeds to operation 612 where a fallback query is used. For example, a fallback query may include a query such as, "sorry, I didn't hear you well," "sorry, I don't understand what you mean," and the like. When it is determined that the ranking of the dialog hypothesis set is not ambiguous, flow proceeds to operation 614 where an action is performed based on the ranking. For example, the action performed may include using the highest ranked dialog hypothesis to query a web backend engine for results and sending the results to the user of the client computing device. In another example, the action performed may include sending a generic web search query to a backend engine.

Figure 7:
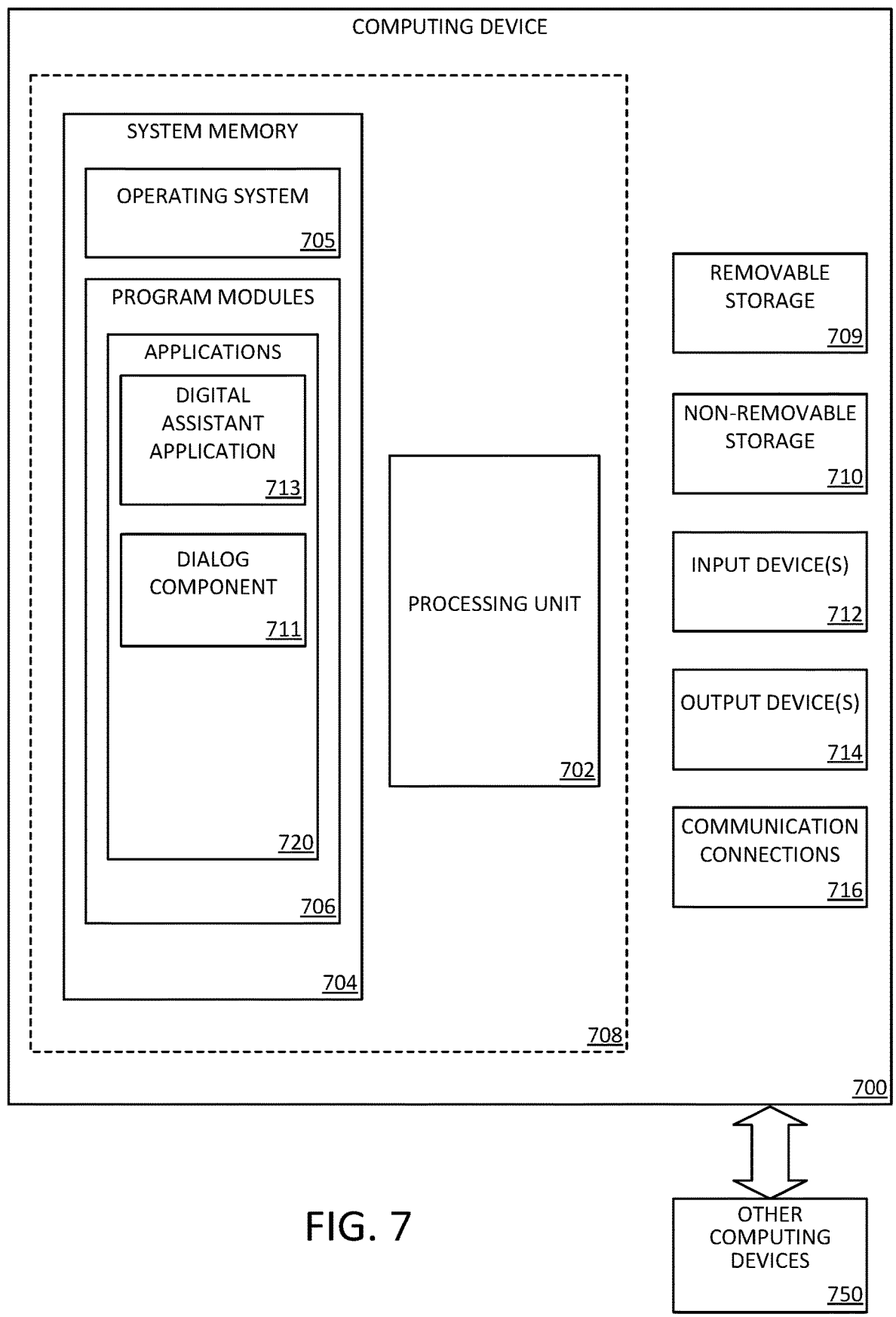
FIG. 7 is a block diagram illustrating example physical components of a computing device with which embodiments of the disclosure may be practiced.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing embodiments of the disclosure, described herein FIG. 7 is a block diagram illustrating physical components (e.g., hardware) of a computing device 700 with which aspects of the disclosure may be practiced. The computing device components described below may have computer executable instructions for a digital assistant application 713, e.g., of a client and/or computer, executable instructions for contextual language understanding module 711, e.g., of a client, that can be executed to employ the methods 400 through 600 disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as discriminating ambiguous request applications in regards to FIGS. 1-3 and, in particular, digital assistant application 713 or dialog module 711. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., dialog module 711 or digital assistant application 713) may perform processes including, but not limited to, the aspects, as described herein. Other program modules that may be used in accordance with aspects of the present disclosure, and in particular for contextual language understanding, may include single-turn models, multi-turn models, combination models, final models, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
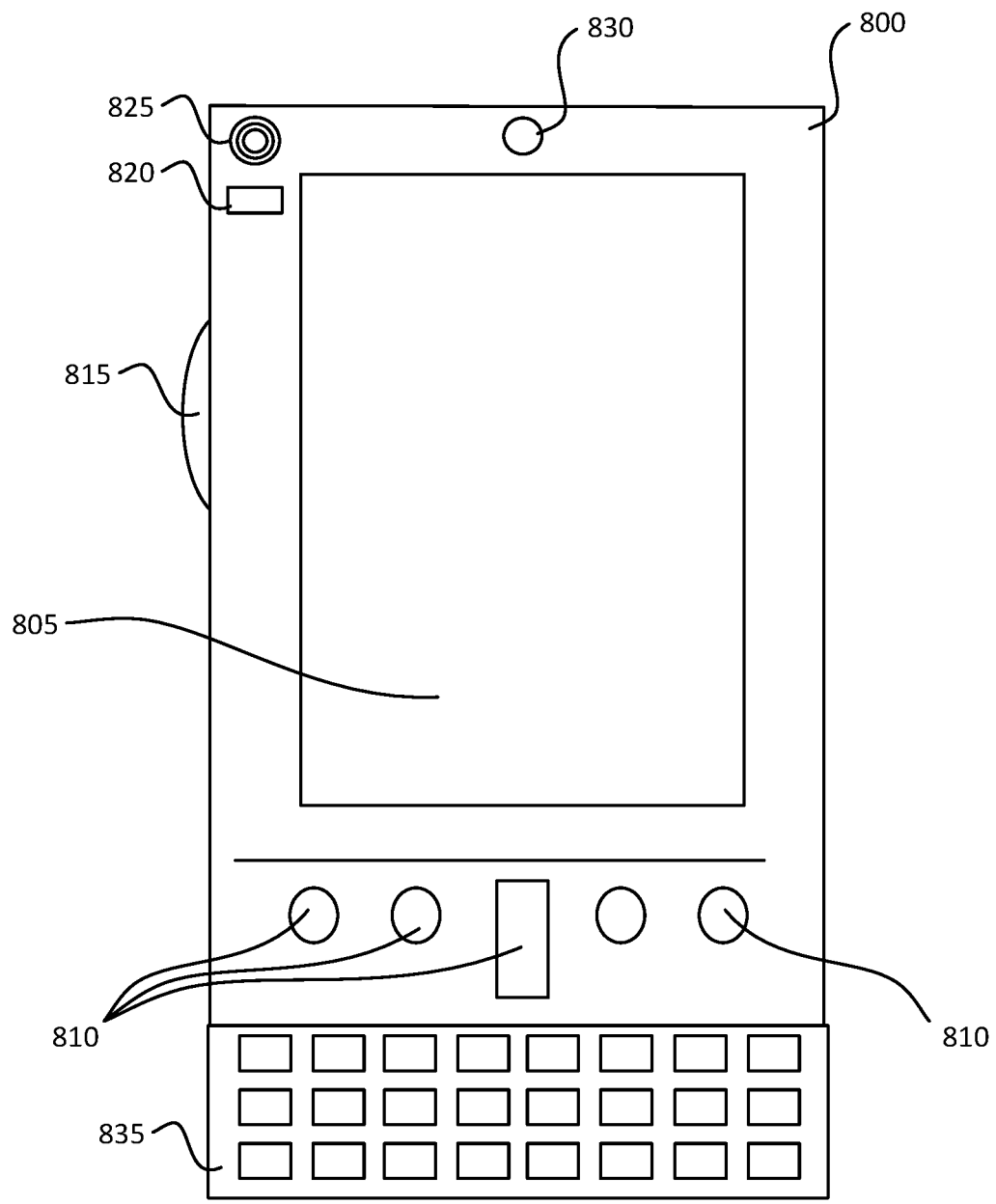
FIGS. 8A and 8B are simplified block diagrams of a mobile computing device with which embodiments of the present disclosure may be practiced.
Figure 8B:
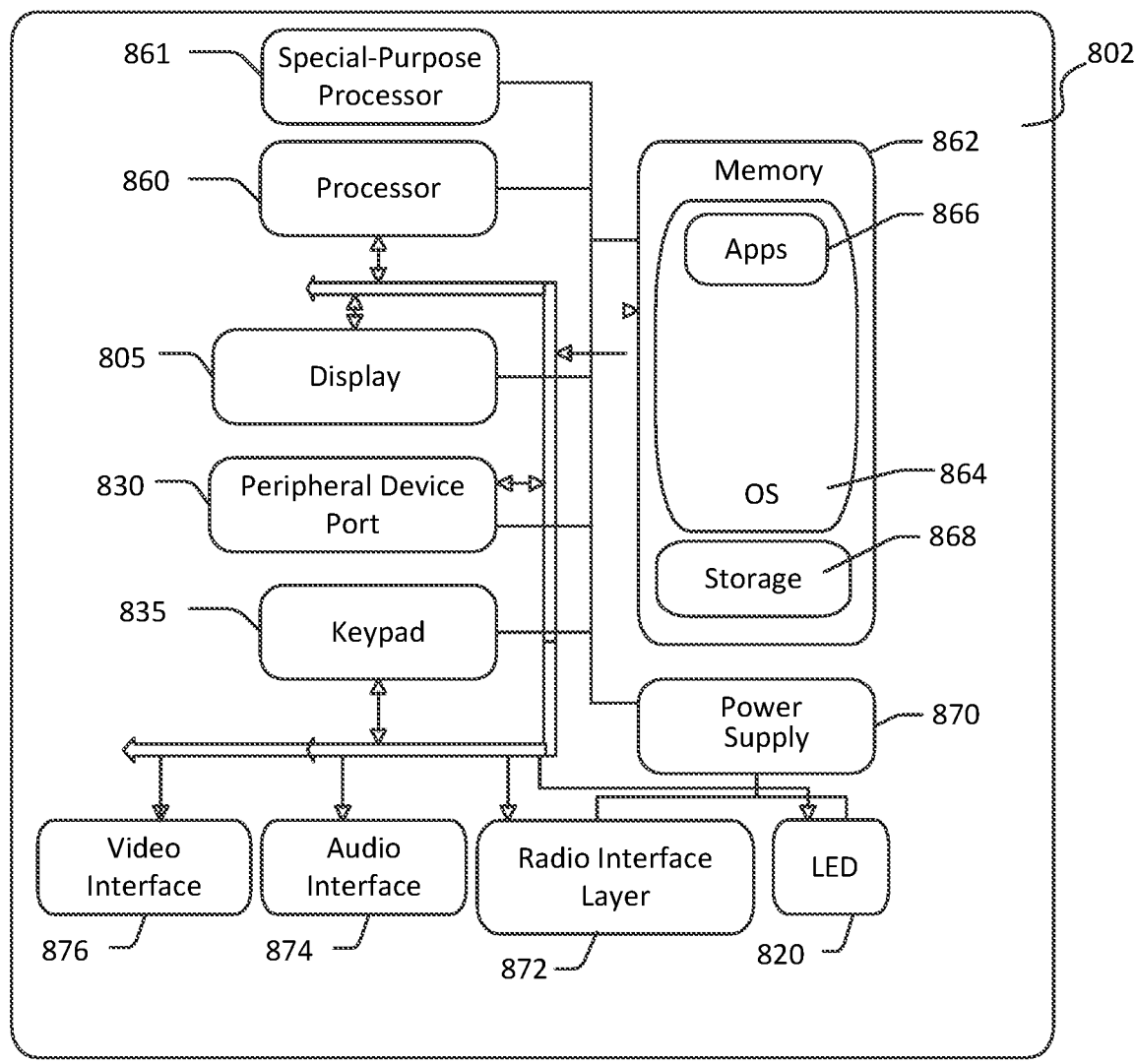

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions to create a calendar event as described herein (e.g., and/or optionally calendar event creation module 711).

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Figure 9:
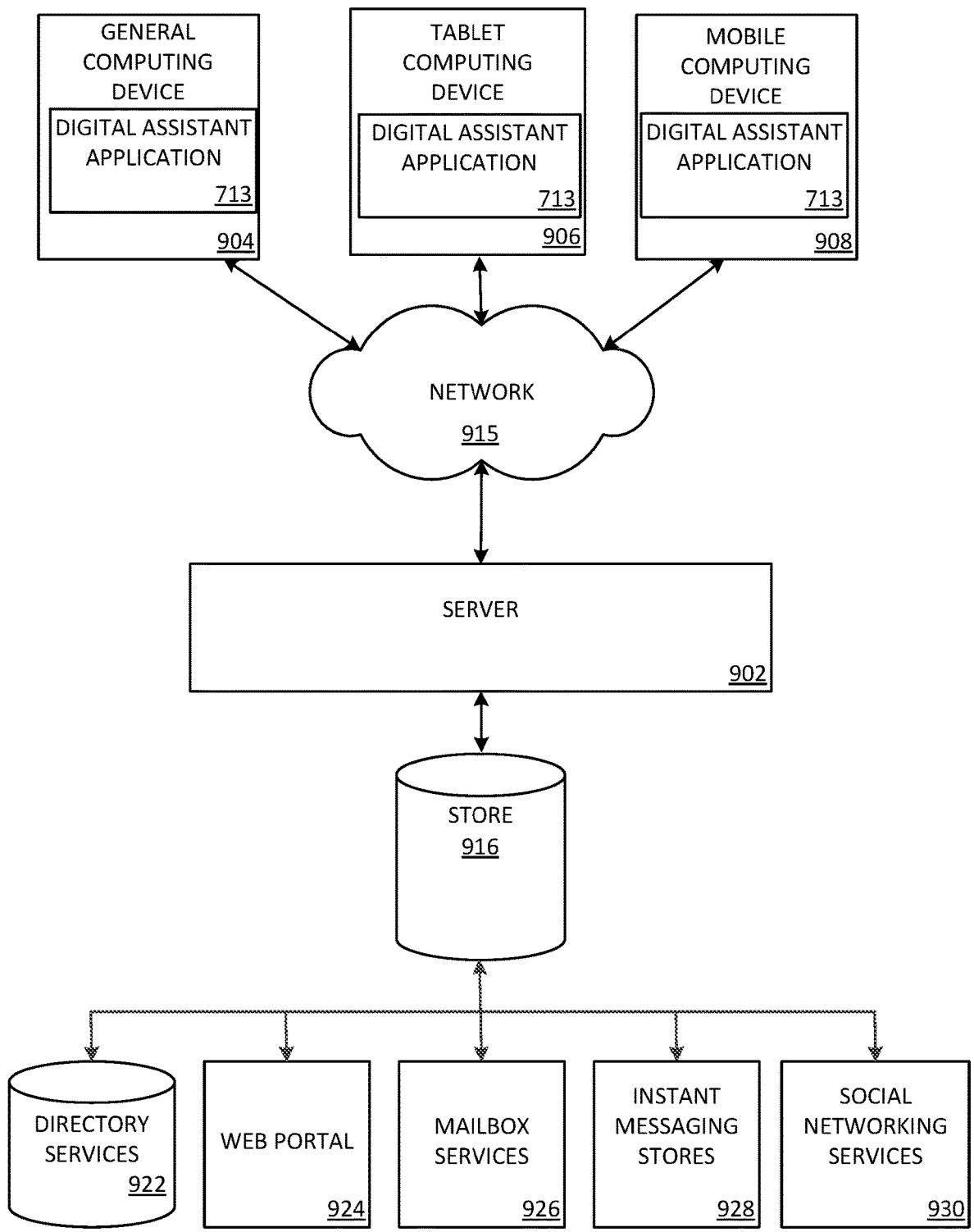
FIG. 9 is a simplified block diagram of a distributed computing system in which embodiments of the present disclosure may be practiced.

FIG. 9 illustrates one aspect of the architecture of a system for processing data received at a computing system from a remote source, such as a computing device 904, tablet 906, or mobile device 908, as described above. Content displayed at server device 902 may be stored in different communication channels or other storage types. For example, various documents may be stored using a directory service 922, a web portal 924, a mailbox service 926, an instant messaging store 928, or a social networking site 930. The digital assistant application 713 may be employed by a client who communicates with server 902. The server 902 may provide data to and from a client computing device such as a personal computer 904, a tablet computing device 906 and/or a mobile computing device 908 (e.g., a smart phone) through a network 915. By way of example, the computer system described above with respect to FIGS. 1-3 may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
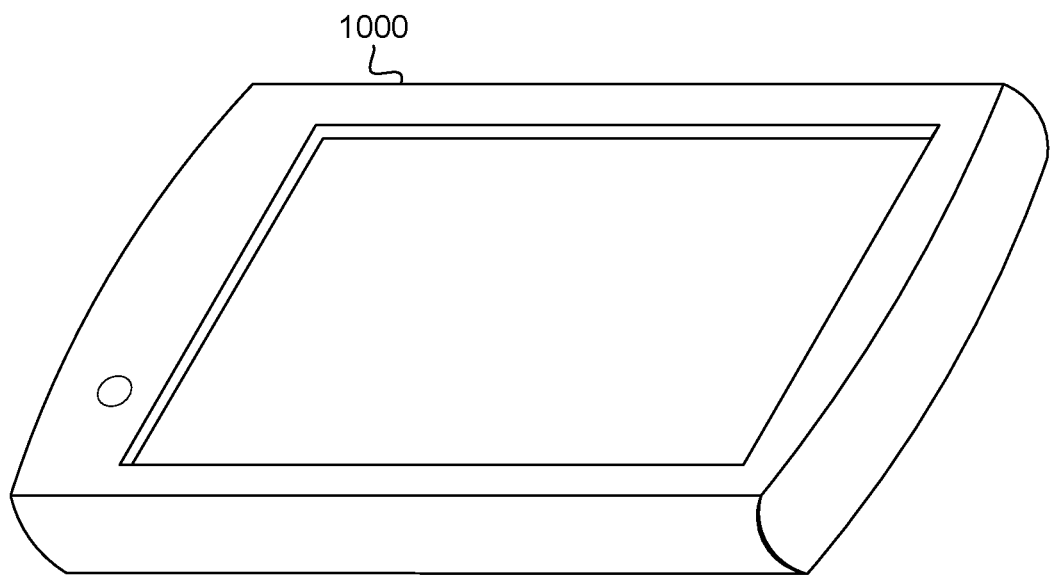
FIG. 10 illustrates a tablet computing device for executing one or more embodiments of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Among other examples, the present disclosure presents systems for discriminating ambiguous requests comprising: receiving a natural language expression, wherein the natural language expression includes at least one of words, terms, and phrases of text; creating a dialog hypothesis set from the natural language expression by using contextual information, wherein the dialog hypothesis set has at least two dialog hypotheses; generating a plurality of dialog responses for the dialog hypothesis set; ranking the dialog hypothesis set based on an analysis of the plurality of the dialog responses; and performing an action based on ranking the dialog hypothesis set. In further examples, the natural language expression is at least one of a spoken language input and a textual input. In further examples, the contextual information includes at least one of information extracted from a previously received natural language expression, a response to a previously received natural language expression, client context, and knowledge content. In further examples, the information extracted from the previously received natural language expression includes at least a domain prediction, an intent prediction, and a slot type. In further examples, creating the dialog hypothesis set comprises: extracting at least one feature from the natural language expression; and generating at least two dialog hypotheses, where each dialog hypothesis of the dialog hypothesis set includes a different natural language expression having at least one extracted feature. In further examples, generating a plurality of dialog responses for the dialog hypothesis set comprises generating a plurality of responses for each dialog hypothesis of the dialog hypothesis set. In further examples, generating a plurality of dialog responses for the dialog hypothesis set comprises at least one of sending the dialog hypotheses to a web backend engine and sending the dialog hypotheses to a domain specific component. In further examples, ranking the dialog hypothesis set based on an analysis of the plurality of the dialog responses comprises: extracting features from the at least two dialog hypotheses in the dialog hypothesis set; and calculating a score for the extracted features, wherein the calculated score is indicative of the dialog hypothesis rank within the dialog hypothesis set. In further examples, ranking the dialog hypothesis set based on an analysis of the plurality of the dialog responses comprises comparing the plurality of the dialog responses with a plurality of logged dialog responses. In further examples, performing an action based on ranking the dialog hypothesis set comprises: using a highest ranked dialog hypothesis to query a web backend engine for results; and sending the results to a user of a client computing device.

Further aspects disclosed herein provide an exemplary system comprising: a speech recognition component for receiving a plurality of natural language expressions, wherein the plurality of natural language expressions include at least one of words, terms, and phrases of text; and a dialog component for: creating a first fallback query from the plurality of natural language expressions, wherein creating the first fallback query comprises concatenating the plurality of natural language expressions; and sending the at least one fallback query to a backend engine for generating search results from the at least one fallback query. In further examples, the system further comprises the dialog component for receiving the search results from the backend engine. In further examples, the system further comprises the dialog component for performing a stop-word removal analysis on the plurality of natural language expressions. In further examples, the system further comprises the dialog component for creating a second fallback query from the plurality of natural language expressions, wherein creating the second fallback query comprises concatenating the stopword removal analysis performed on the plurality of natural language expressions. In further examples, the system further comprises the dialog component for extracting semantic entities from the plurality of natural language expressions. In further examples, the system further comprises the dialog component for creating a third fallback query from the plurality of natural language expressions, wherein creating the third fallback query comprises concatenating the semantic entities extracted from the plurality of natural language expressions.

Additional aspects disclosed herein provide exemplary systems and methods for training a dialog component to discriminate ambiguous requests, the method comprising: creating a dialog hypothesis set from a natural language expression by using contextual information, wherein the dialog hypothesis set has at least two dialog hypotheses; generating a plurality of dialog responses for the dialog hypothesis set; comparing the plurality of dialog responses with a plurality of logged dialog responses; determining whether at least one of the plurality of dialog responses matches at least one of the logged dialog responses; and when it is determined that at least one of the plurality of dialog responses matches at least one of the logged dialog responses, labeling at least one of the two dialog hypotheses in the dialog hypothesis set corresponding to the at least one dialog response that matches the at least one logged dialog response. In further examples, the plurality of logged dialog responses includes a plurality of responses generated from the natural language expression. In further examples, creating the dialog hypothesis set comprises: extracting at least one feature from the natural language expression; and generating at least two dialog hypotheses, where each dialog hypothesis of the dialog hypothesis set includes a different natural language expression having at least one extracted feature. In further examples, labeling at least one of the two dialog hypotheses in the dialog hypothesis set corresponding to the at least one dialog response that matches the at least one logged dialog response indicates that the natural language expression having the at least one extracted feature can be used to generate relevant responses.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory encoding computer executable instructions that, when executed by at least one processor, perform a method comprising:
      receiving a natural language expression during a multi-turn session, wherein the natural language expression includes at least one of words, terms, and phrases of text;
      generating, by executing a machine learning technique, a first dialog hypothesis and a second dialog hypothesis from the natural language expression by using contextual information, wherein the contextual information is extracted from a previous turn in the multi-turn session;
      sending the first dialog hypothesis to a backend component;
      receiving a dialog response for the first dialog hypothesis from the backend component;
      determining a domain component to send the second dialog hypothesis based on a predicted domain for the second dialog hypothesis;
      receiving a dialog response for the second dialog hypothesis from the determined domain component;
      ranking the first dialog hypothesis and the second dialog hypothesis based on an analysis of the plurality of the dialog responses; and
   based on the ranking of the first dialog hypothesis and the second dialog hypothesis, executing an action to provide a response to the natural language expression in the multi-turn session, wherein executing the action to provide a response to the natural language expression includes:
      using a highest ranked dialog hypothesis of the first dialog hypothesis or the second dialog hypothesis to query the backend component for results, and
      sending the results to a computing device.

2. The system of claim 1, wherein the natural language expression is at least one of a spoken language input and a textual input.

3. The system of claim 1, wherein the contextual information includes at least one of information extracted from a previously received natural language expression, a response to a previously received natural language expression, client context, and knowledge content.

4. The system of claim 3, wherein the information extracted from the previously received natural language expression includes at least a domain prediction, an intent prediction, and a slot type.

5. The system of claim 1, wherein creating the first dialog hypothesis and the second dialog hypothesis comprises:
   extracting at least one feature from the natural language expression; and
   generating the first dialog hypothesis and the second dialog hypothesis, wherein the first dialog hypothesis includes a different natural language expression having at least one extracted feature than the second dialog hypothesis.

6. The system of claim 1, wherein the backend component is a web backend engine and the domain component is a domain specific component.

7. The system of claim 1, wherein ranking the first dialog hypothesis and the second dialog hypothesis based on an analysis of the plurality of the dialog responses comprises:
  extracting features from the first dialog hypothesis and the second dialog hypothesis; and
  calculating a score for the extracted features, wherein the calculated score is indicative of the dialog hypothesis rank.

8. The system of claim 1, wherein ranking the first dialog hypothesis and the second dialog hypothesis based on an analysis of the plurality of the dialog responses comprises comparing the plurality of the dialog responses with a plurality of logged dialog responses.

9. A method comprising:
  receiving a natural language expression, wherein the natural language expression includes at least one of words, terms, and phrases of text;
  generating, by executing a machine learning technique, a first dialog hypothesis and a second dialog hypothesis from the natural language expression by using contextual information, wherein the first dialog hypothesis and the second dialog hypothesis include different hypotheses of actions to perform based on the natural language expression;
  determining a backend component to send the first dialog hypothesis;
  receiving a dialog response for the first dialog hypothesis from the determined backend component;
  determining a domain component to send the second dialog hypothesis based on a predicted domain associated with the second dialog hypothesis;
  receiving a dialog response for the second dialog hypothesis from the determined domain component;
  extracting first features from the first dialog hypothesis and the dialog response for the first dialog hypothesis;
  extracting second features from the second dialog hypothesis and the dialog response for the second dialog hypothesis;
  ranking the first dialog hypothesis and the second dialog hypothesis based on an analysis of the extracted first features and extracted second features; and
  based on the ranking of the first dialog hypothesis and the second dialog hypothesis, executing an action to provide a response to the natural language expression,
  wherein executing the action to provide a response to the natural language expression includes:
    using a highest ranked dialog hypothesis of the first dialog hypothesis or the second dialog hypothesis to query a backend component for results, and
    sending the results to a computing device.

10. The method of claim 9, wherein the natural language expression is at least one of a spoken language input and a textual input.

11. The method of claim 9, wherein the contextual information includes at least one of information extracted from a previously received natural language expression, a response to a previously received natural language expression, client context, and knowledge content.

12. The method of claim 11, wherein the information extracted from the previously received natural language expression includes at least a domain prediction, an intent prediction, and a slot type.

13. The method of claim 9, wherein the backend component is a web backend engine and the domain component is a domain specific component.

14. The method of claim 9, wherein ranking the first dialog hypothesis and the second dialog hypothesis based on an analysis of the plurality of the dialog responses comprises comparing the plurality of the dialog responses with a plurality of logged dialog responses.

15. One or more computer-readable storage media, having computer-executable instructions that, when executed by at least one processor, perform a method for discriminating ambiguous requests, the method comprising:
  creating, by executing a machine learning technique, a dialog hypothesis set from a natural language expression, received during a multi-turn session, by using contextual information extracted from a previous turn in the multi-turn session, wherein the dialog hypothesis set has at least two dialog hypotheses;
  generating a plurality of dialog responses for the dialog hypothesis set;
  comparing the plurality of dialog responses with a plurality of logged dialog responses;
  determining whether at least one of the plurality of dialog responses matches at least one of the logged dialog responses;
  when it is determined that at least one of the plurality of dialog responses matches at least one of the logged dialog responses, labeling at least one of the two dialog hypotheses in the dialog hypothesis set corresponding to the at least one dialog response that matches the at least one logged dialog response; and
  performing an action based on the labeled at least one of the two dialog hypotheses to provide a response to the natural language expression, wherein performing an action based on the labeled at least one of the two dialog hypotheses includes:
    using the labeled at least one of the two dialog hypotheses to query a backend component for results, and
    sending the results to a computing device.

16. The computer-readable storage media of claim 15, wherein the plurality of logged dialog responses includes a plurality of responses generated from the natural language expression.

17. The computer-readable storage media of claim 15, wherein creating the dialog hypothesis set comprises:
  extracting at least one feature from the natural language expression; and
  generating at least two dialog hypotheses, where each dialog hypothesis of the dialog hypothesis set includes a different natural language expression having at least one extracted feature.

18. The computer-readable storage media of claim 17, wherein labeling at least one of the two dialog hypotheses in the dialog hypothesis set corresponding to the at least one dialog response that matches the at least one logged dialog response indicates that the natural language expression having the at least one extracted feature can be used to generate relevant responses.

* * * * *